United States Patent
Desai et al.

(10) Patent No.: US 9,507,722 B2
(45) Date of Patent: Nov. 29, 2016

(54) METHODS, SYSTEMS, AND COMPUTER READABLE MEDIA FOR SOLID STATE DRIVE CACHING ACROSS A HOST BUS

(71) Applicant: SanDisk Technologies Inc., Plano, TX (US)

(72) Inventors: Girish Bhaurao Desai, Cupertino, CA (US); Venkata Krishna Nadh Dhulipala, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 93 days.

(21) Appl. No.: 14/297,563

(22) Filed: Jun. 5, 2014

(65) Prior Publication Data

US 2015/0356020 A1 Dec. 10, 2015

(51) Int. Cl.
*G06F 12/08* (2016.01)

(52) U.S. Cl.
CPC ... *G06F 12/0873* (2013.01); *G06F 2212/1021* (2013.01); *G06F 2212/1041* (2013.01); *G06F 2212/205* (2013.01); *G06F 2212/221* (2013.01); *G06F 2212/283* (2013.01); *G06F 2212/313* (2013.01); *G06F 2212/608* (2013.01)

(58) Field of Classification Search
None
See application file for complete search history.

(56) References Cited

U.S. PATENT DOCUMENTS

| | | |
|---|---|---|
| 8,775,741 B1 | 7/2014 | de la Iglesia |
| 2003/0188184 A1 | 10/2003 | Strongin et al. |
| 2006/0106984 A1 | 5/2006 | Bartley et al. |
| 2009/0228875 A1 | 9/2009 | DeVries |
| 2010/0262721 A1 | 10/2010 | Asnaashari et al. |
| 2011/0296088 A1 | 12/2011 | Duzly et al. |
| 2011/0320685 A1* | 12/2011 | Gorobets ............ G06F 12/0246 711/103 |
| 2012/0051137 A1* | 3/2012 | Hung ................ G11C 16/0466 365/185.17 |
| 2012/0284587 A1* | 11/2012 | Yu ........................ G06F 3/0608 714/773 |
| 2012/0317335 A1 | 12/2012 | Cho |
| 2013/0080732 A1 | 3/2013 | Nellans et al. |
| 2013/0086311 A1 | 4/2013 | Huang et al. |
| 2013/0262533 A1 | 10/2013 | Mitra et al. |
| 2013/0275672 A1 | 10/2013 | Bert |
| 2013/0297852 A1 | 11/2013 | Fai et al. |
| 2014/0149641 A1 | 5/2014 | Avila et al. |
| 2014/0289492 A1 | 9/2014 | Ranjith Reddy et al. |
| 2014/0337560 A1* | 11/2014 | Chun ................ G06F 12/0246 711/103 |
| 2016/0026406 A1 | 1/2016 | Hahn et al. |
| 2016/0054931 A1 | 2/2016 | Romanovsky et al. |
| 2016/0054934 A1 | 2/2016 | Hahn et al. |

OTHER PUBLICATIONS

"NVM Express Overview," NVM Express, pp. 1-2 (copyright 2013).

(Continued)

*Primary Examiner* — Gary Portka
(74) *Attorney, Agent, or Firm* — Jenkins, Wilson, Taylor & Hunt, P.A.

(57) ABSTRACT

Methods, systems, and computer readable media for solid state drive caching across a host bus are disclosed. According to one aspect, a method for solid state caching across host bus includes, during operation of a solid state drive (SSD) having non-volatile memory (NVM) for bulk storage of data and metadata, a first random access memory (RAM), and a host bust interface for accessing a second RAM memory located on a host and separate from the first RAM, using the first RAM as a cache for storing a first portion of metadata, and using the second RAM as a cache for storing a second portion of metadata, where the second RAM is accessed by the SSD via the host bus interface.

19 Claims, 4 Drawing Sheets

(56) References Cited

OTHER PUBLICATIONS

"Understanding the Flash Translation Layer (FTL) Specification," AP-684 Application Note, Intel, pp. 1-20 (Dec. 1998).

Commonly-assigned, co-pending U.S. Appl. No. 14/977,559 for "Methods, Systems, and Computer Readable Media for Automatically and Selectively Enabling Burst Mode Operation in a Storage Device" (Unpublished, filed Dec. 21, 2015).

Non-Final Office Action for U.S. Appl. No. 14/464,584 (Dec. 4, 2015).

Commonly-assigned, co-pending U.S. Appl. No. 14/555,548 for Storage Devices and Methods for Optimizing Use of Storage Devices Based on Storage Device Parsing of File System Metadata in Host Write Operations, (Unpublished, filed Nov. 26, 2014).

"Ext4 Disk Layout," https://ext4.wiki.kernel.org/index.php/Ext4_Disk_Layout, Wikipedia, pp. 1-28 (Nov. 17, 2014).

"CreateFile function." Microsoft Windows Dev Center, https://msdn.microsoft.com/en-us/library/windows/desktop/aa363858(v=vs.85).aspx, pp. 1-20 (2008).

"NVM Express," Specification Revision 1.2, http://nvmexpress.org/wp-content/uploads/NVM_Express_1_2_Gold_20141209.pdf, pp. 1-205 (Nov. 3, 2014).

"I/O Limits: block sizes, alignment and I/O hints," Red Hat, http://people.redhat.com/msnitzer/docs/io-limits.txt, pp. 1-4 (Jan. 14, 2013).

\* cited by examiner

METHODS, SYSTEMS, AND COMPUTER READABLE MEDIA FOR SOLID STATE DRIVE CACHING ACROSS A HOST BUS

TECHNICAL FIELD

The subject matter described herein relates to methods and systems for operating solid state drives. More particularly, the subject matter described herein relates to methods, systems, and computer readable media for solid state drive caching across a host bus.

BACKGROUND

Solid state drives, or SSDs, are mass storage devices that use flash memory for bulk memory storage rather than the rotating magnetic disks used in traditional hard disk drives (HDDs) and are typically intended as a drop-in replacement for HDDs, meaning that the SSD is pin- and protocol-compatible with the HDD that is replaces. SSDs typically have faster access time and use less power than a comparable HDD, but usually cost substantially more than a comparable HDD. It is expected that SSDs will widely replace HDDs as the cost of SSDs continues to go down.

SSDs typically include a cache memory for temporarily storing data being read from or written to the SSD. Conventional SSD designs use SRAM for the level one (L1) cache, NAND or NOR flash memory for the level two (L2) cache, and NAND flash memory for the mass data storage (also called "bulk data storage" or "bulk storage".) SDRAM is also used to store a flash transition list's (FTC's) metadata. The L1 cache can be part of SRAM, which can be on chip. The L1 cache can also be part of DRAM, which can be part of the storage device address space and solely addressable by the storage device. Though SRAM or DRAM improves the performance, neither technology is favorable to a low end/low cost SSD, as using SRAM or DRAM increases die size, cost of materials and power consumption.

There are disadvantages associated with these conventional SSD designs, however. Although the SRAM used for the L1 cache is fast, the memory density of SRAM is quite low compared to flash memory, and so the memory capacity of the L1 cache is relatively small. It is possible to increase the L1 cache capacity by increasing the amount of SRAM on the SSD, but this leads to increased die size and cost. As SSDs become commodity items, it is important to keep the size of the silicon die down, and so increasing the amount of SRAM on the SSD (referred to as "on-board SRAM") is disfavored.

The flash memory typically used for the L2 cache has a high memory density relative to the die size, also has disadvantages. NOR flash is true random access memory, but has a lower memory density relative to NAND flash. NAND flash has a higher memory density relative to NOR flash, but must be accessed a page at a time, which necessitates the use of additional hardware, called the flash translation layer, or FTL, to make it appear as if the NAND flash supports true random access.

The use of an NAND flash for the L2 cache, however, imposes additional costs and constraints. Because flash is erasable only in large chunks, called pages—a common page size is 4096 bytes—modifying a single byte or word of NAND flash in actuality requires modification of an entire page at a time. Since flash memories degrade over time proportional to the number of program/erase cycles performed, the illusion of random access provided by the FTL has the undesired side effect of reducing the operating life flash memory.

Thus, the use of on-board flash as cache memory is less desirable than the use of RAM, and the use of SRAM as cache memory is limited by the physical size constraints of the on-board SRAM memory that would be required. Therefore, what is desired is an SSD that provides the advantages of a large RAM cache but without the disadvantages of either on-board flash or on-board SRAM. In addition, it is desirable to have an SSD architecture that can be configured for use for either high-end (high cost, high performance) and low-end (low cost, low power consumption) markets.

Accordingly, in light of these disadvantages associated with conventional SSD architectures, there exists a need for methods, systems, and computer readable media for solid state drive caching across a host bus.

SUMMARY

According to one aspect, the subject matter described herein includes a method for solid state drive caching across a host bus. In one embodiment, the method includes, during operation of a solid state drive (SSD) having non-volatile memory (NVM) for bulk storage of data and metadata, a first random access memory (RAM), and a host bus interface for accessing a second RAM memory located on a host and separate from the first RAM, using the first RAM as a cache for storing a first portion of metadata, and using the second RAM as a cache for storing a second portion of metadata, where the second RAM is accessed by the SSD via the host bus interface.

According to another aspect, the subject matter described herein includes a system for solid state caching across host bus. In one embodiment, the system includes a solid state drive (SSD) having non-volatile memory (NVM) for bulk storage of data and metadata, a first random access memory (RAM), and a host bus interface for accessing a second RAM memory located on a host and separate from the first RAM. The SSD drive is configured to use the first RAM as a cache for storing a first portion of metadata and use the second RAM as a cache for storing a second portion of metadata, where the second RAM is accessed by the SSD via the host bus interface.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for solid state drive caching across a host bus are provided. Reference will now be made in detail to exemplary embodiments of the present invention, examples of which are illustrated in the accompanying drawings. Wherever possible, the same reference numbers will be used throughout the drawings to refer to the same or like parts.

In order to meet the needs of both high-end markets, such as desktop personal computers and servers, and low-end markets, such as laptops, tablets, and smartphones, the subject matter described herein includes an SSD architecture that can perform caching across a host bus, i.e., an SSD device that can store some of its cache in the host memory rather than on the SSD device. By reversing the normal direction of cache operations—the host caches data for the SSD rather than the SSD caching data for the host as is conventionally done—the SSD device can have a cache as large as it needs, limited only by the amount of RAM present and available on the host. This technique allows a single SSD architecture to be used for both low-end markets which do not require much cache area and instead value low power consumption and high-end markets for which large caches provide performance benefits.

Figure 1:
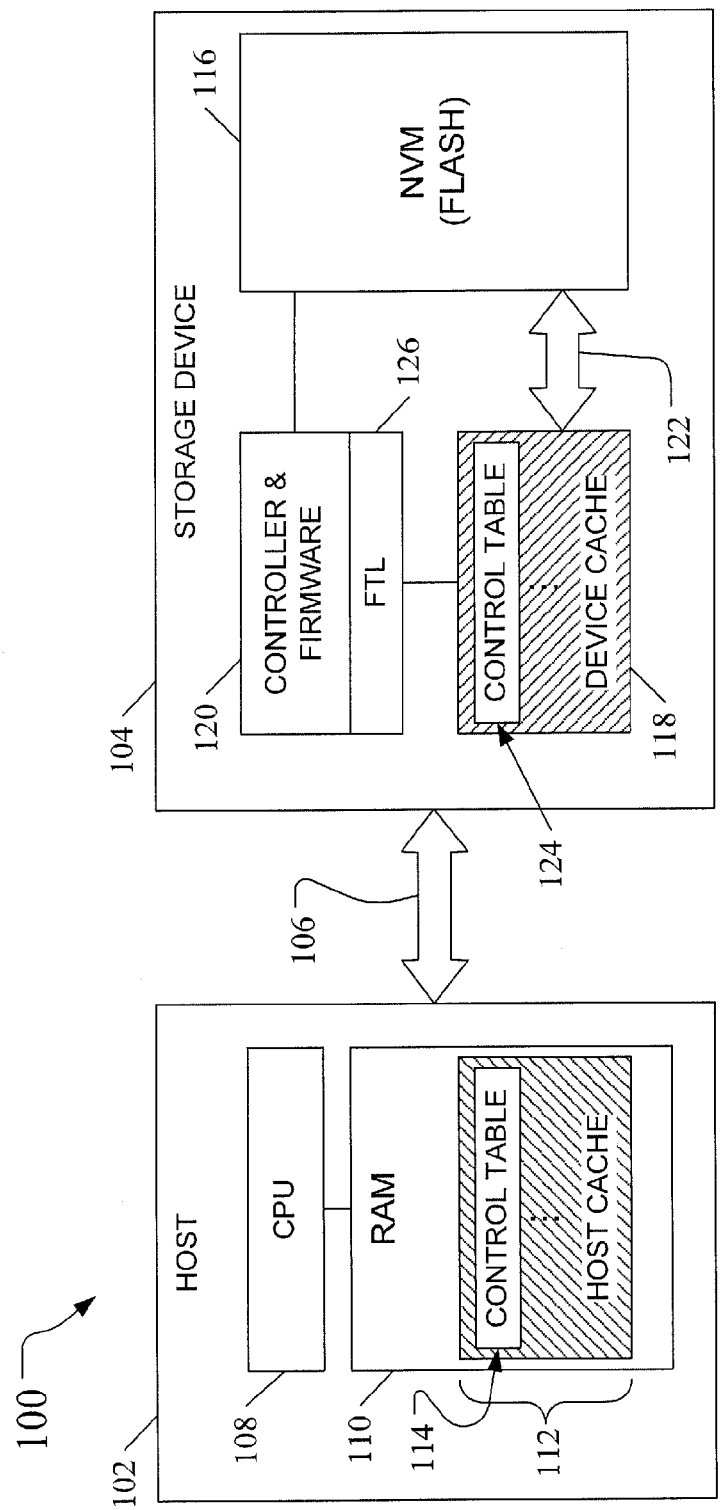
FIG. 1 is a block diagram showing an exemplary system for solid state drive caching across a host bus according to an embodiment of the subject matter described herein.

FIG. 1 is a block diagram showing a system for solid state drive caching across a host bus according to an embodiment of the subject matter described herein. In the embodiment illustrated in FIG. 1, system 100 includes a host 102 that is connected to as storage device 104 via a host bus 106.

Host 102 may be a personal computer, for example, or other device to which a storage device may be attached. In one embodiment, host 102 includes a CPU 108 or other processor hardware and random access memory (RAM) 110. In the embodiment illustrated in FIG. 1, a portion of RAM 110 has been set aside as a host cache 112 for use by device 104 to store one or more control tables 114, the purpose of which will be explained in more detail below.

Device 104 may be a solid state drive or other mass storage device that includes non-volatile memory. In the embodiment illustrated in FIG. 1, device 104 includes non-volatile memory (NVM) 116 such as flash for mass storage, a device cache 118, which may be SRAM, for example, and a controller 120 or other processor. In one embodiment, controller 120 may include or have access to local firmware for controlling the operation of device 104. In one embodiment, a local bus 122 connects NVM 116 and device cache 118.

In the embodiment illustrated in FIG. 1, device 104 uses device cache 118 to store metadata related to the configuration, operation, and/or contents of device 104. In one embodiment, device 104 may store metadata in the form of control tables 124 that reside within NVM 116 and that are loaded into device cache 118 via local bus 122 when faster access time is required. Examples of device 104 metadata that may be stored in a control table 124, include, but are not limited to, configuration data that is loaded at boot time from NVM 116 and never modified, control tables for flash management that are always backed up, and garbage collection data for which the sources are available on NVM 116. In one embodiment, control tables 124 are used by a flash translation layer FTL 126.

There is a direct correlation between the size of cache 118 and the performance efficiency of device 104: the larger the size of cache 118, the more control tables 124 may be stored there, and the less often metadata must be swapped between NVM 116 and cache 118. A device with a small cache 118 is not suitable for high-performance applications. A device with a large cache 118 is not suitable for the low-power applications, however.

The subject matter described herein addresses the issue of available cache space on an SSD by formulating a method that allows caching across the host bus. In the embodiment illustrated in FIG. 1, for example, device 104 retrieves metadata from NVM 116 and stores that metadata, possibly in the form of a control table 124, in cache 118. When cache 118 becomes full, if more metadata is needed, as in the case of a high-end application, for example, rather than moving some metadata from cache 118 back into NVM 116, device 104 will transfer that metadata from cache 118 into host buffer 112 via host bus 106. In this manner, host cache 112 becomes an extension of device cache 118, providing overflow space as needed for high-performance applications of device 104. Thus, a host collaborates with a device to maximize efficiency by allowing the device to cache some of the device metadata across the host bus, thus reducing the need for expensive metadata accesses from non-volatile storage.

This approach has several advantages. If the bandwidth across local bus 122 is less than the bandwidth across host bus 106 (which is often the case with high-speed host buses), this scheme balances host and flash bandwidth and thus less flash activity and error correction and less overall power consumption are required. Controller and product cost is reduced. By not requiring DRAM, power consumption of device 104 is reduced. By using a small device cache 118, such as one suitable for low-end applications, and using host cache 112 for additional space as may be required for high-end applications, the overall die size and product cost is further reduced. The same design may thus be used for both low-end and high-end markets, which reduces development cost. There is no need to change FTL design to address bigger page sizes, which might induce write amplification and therefore endurance issues as well as increase time to market. Even if the bandwidth across local bus 122 is not less than the bandwidth across host bus 106, the use of host cache 112 can still reduce the number of access times into NVM 116 and thus improve endurance times of NVM 116.

Conceptually, the techniques described herein can be thought of as providing a multiple-layer cache architecture, where device cache 118 operates as the L1 cache, host cache 112 operates as the L2 cache, and NVM 116 operates as the L3 cache.

In one embodiment, device 104 may be configured to move only certain kinds of metadata into host cache 112. For example, device 104 may use host cache 112 to store data that, if lost, would not compromise the integrity of user data or that device 104 should be able to reconstruct. This protects the operation of device 104 even if the connection to host cache 112 is severed, such as may happen if host 102 and device 104 become physically disconnected from each other (e.g., when device 104 is unplugged from host 102) or logically disconnected from each other (e.g., if host 102 is shutdown or reset.) Thus, in the event of power failure or a loss of connectivity between host 102 and device 104, the data integrity is not compromised; device 104 continues to function by reading tables from NVM 116 into its local RAM cache 118 (L1) as required and writing back least recently used tables back to NVM 116.

In one embodiment, device 104 may include software and/or firmware that includes a front-end that is the interface between commands sent by host 102 and FTL 126. FTL 126 may use information stored in control table 124 to translate host accesses into NVM 116 accesses. In conventional systems in which both the FTL and the metadata used by the FTL are on the same storage device, the amount of metadata stored is limited by the size of the local cache. The metadata can be quite large—typically about 1/1000th the size of the bulk flash memory. Putting both the FTL and the metadata used by the FTL on the host is possible. If the FTL and associated metadata are stored on the host, the FTL must store information relating to flash geometry, number of channels, number of free blocks, number of bad blocks, etc. In one embodiment, the mapping table may be stored on the host DRAM, rather than in SRAM on the device.

It should be noted that NVM 116 on storage device 104 can be implemented using any suitable memory technology. For example, NVM 116 may be implemented using 2D or 3D NAND flash memory or any combination of 2D and 3D flash memory. In one exemplary implementation, NVM 116 may be implemented using BiCS 3D NAND flash memory available from SanDisk Corporation.

Figure 2:
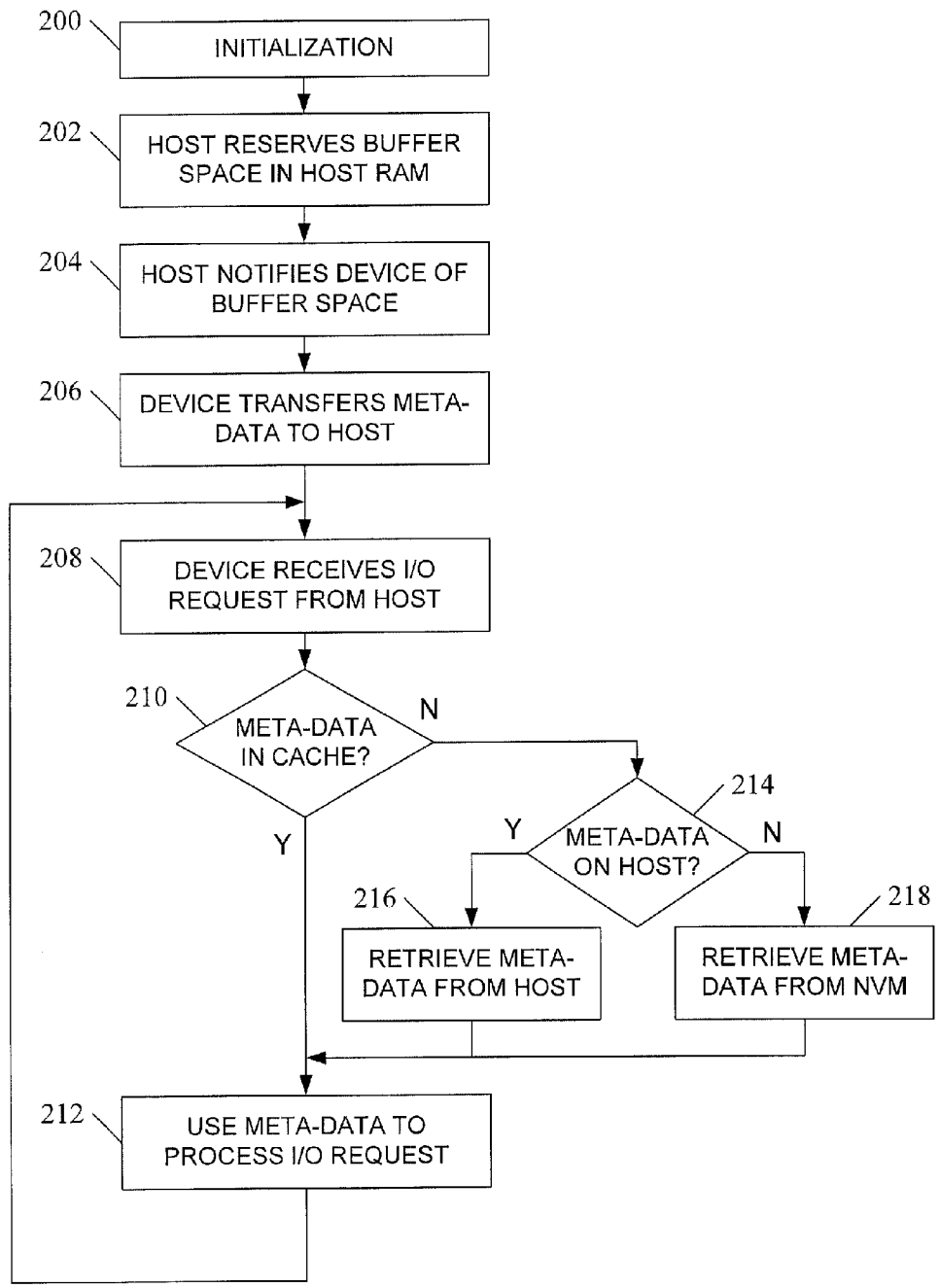
FIG. 2 is a flow chart illustrating an exemplary process for solid state drive caching across a host bus according to an embodiment of the subject matter described herein.

FIG. 2 is a flow chart illustrating an exemplary process for solid state drive caching across a host bus according to an embodiment of the subject matter described herein. The steps of this process will now be described with reference to FIGS. 1 and 2.

In the embodiment illustrated in FIG. 2, the process starts with an initialization 200 during which a host and/or a device may be initialized. Referring to the embodiment illustrated in FIG. 1, for example, host 102, device 104, or both may execute an initialization routine. For example, initialization may occur when a removable storage device, such as an SSD, is attached to a host, when the host or device is first powered up, in response to a user-driven initialization event such as a reset, or other event. In one embodiment, initialization 200 may include establishing the connection between host 102 and device 104 over host bus 106.

At step 202, the host reserves buffer space in host RAM. In the embodiment illustrated in FIG. 1, for example, host 102 may set aside a portion of RAM 110 for use as a host cache 112. It should be noted that host 102 may allocate actual RAM space for host cache 112, but that host 102 may also implement some form of memory management in which relatively rarely used memory may be cached to a host mass storage device, such as a hard disk drive (HDD), SSD, or other form of secondary storage. Thus, host cache 112 may be subject to memory management policies on host 102 and as a result be moved to some other location, with the understanding that when access to host cache 112 is required, that data would be restored back to host ram 110 prior to use.

At step 204, the host notifies the device of the available buffer space. In the embodiment illustrated in FIG. 1, for example, host 102 may send a notification to device 104 indicating that host cache 112 is available for use by device 104, along with other information that may be needed by device 104, such as the address or location of host cache 112 within RAM 110, etc.

At step 206, the device may transfer metadata to the host. This step may be executed at any point after step 204. Step 206 may also occur multiple times as needed, and may occur as a result of a variety of trigger conditions. For example, step 206 may occur immediately after device 104 is notified of the availability of host cache 112, or it may not occur until device cache 118 has run out of space and host cache 112 is needed as overflow capacity.

In one embodiment, device 104 may transfer to host cache 112 all of the metadata currently maintained by device 104. This is useful when it is faster for device 104 to retrieve metadata from host 102 via host bus 106 than it is for device 104 to retrieve metadata from its own NVM 116. This is also useful when device cache 118 capacity is very limited.

In an alternative embodiment, device 104 may transfer just a subset of metadata to host cache 112. As stated above, device 104 may be configured to transfer only certain kinds of metadata to host cache 112.

At step 208, device receives an I/O request from the host. In the embodiment illustrated in FIG. 1, for example, device 104 may receive a read, write, or other I/O request from host 102.

At step 210, the device determines whether the metadata needed to process or fulfill the received I/O request is currently stored on the device cache. In the embodiment illustrated in FIG. 1, for example, device 104 may attempt to read the needed information from device cache 124. If the needed metadata is found in device cache 124, the process goes to step 212.

At step 212, the metadata is used to process the I/O request. The system then waits for the next I/O request, at which time the process will return to step 208, repeating as needed.

If, at step 210, the needed metadata is not currently found on the device, the process moves to step 214, which checks for the presence of the needed metadata within the host cache 112. If the metadata exists within host cache 112, the data is retrieved from the host (step 216) and used (step 212.) If, at step 214, the metadata does not exist on the host, the data is retrieved from the non-volatile memory (step 218) and used (step 212.)

In this manner, a host may collaborate with a device to maximize the efficiency of the device by allowing the device to cache some of the device metadata across the host bus, thus avoiding expensive metadata accesses from the non-volatile storage.

Figure 3:
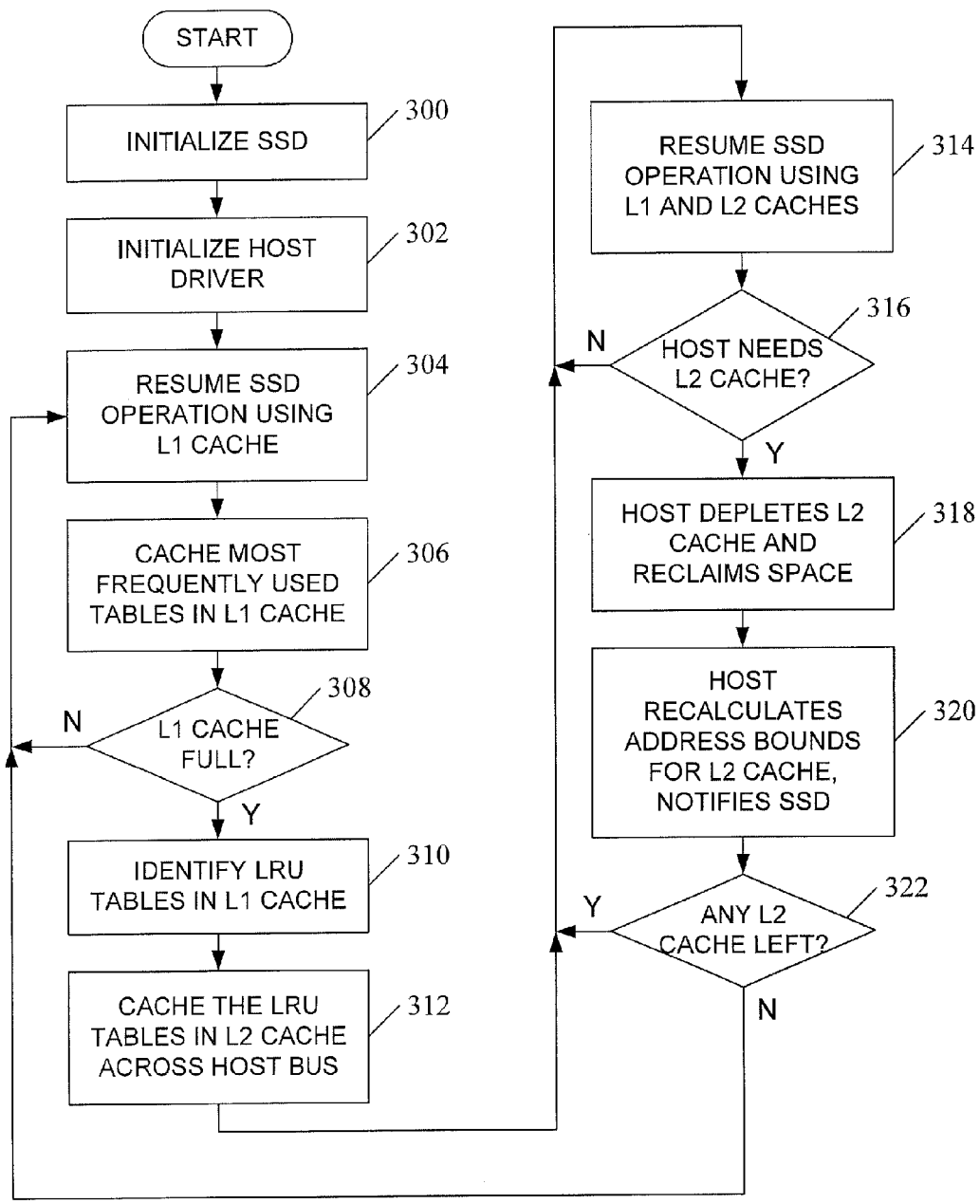
FIG. 3 is a flow chart illustrating an exemplary process for solid state drive caching across a host bus according to another embodiment of the subject matter described herein.

FIG. 3 is a flow chart illustrating an exemplary process for solid state drive caching across a host bus according to another embodiment of the subject matter described herein. In the embodiment illustrated in FIG. 3, the interaction is between a host and an SSD, but the same principles may be applied to an interaction between other types of devices.

In the embodiment illustrated in FIG. 3, the process starts by initializing the SSD (step 300.) In one embodiment, this may include initializing SSD control tables or other metadata and initializing the L1 cache. Referring to FIG. 1, for example, controller 120 may clear device cache 118 ad set up control table(s) 124.

At step 302, the host driver is initialized. In one embodiment, this may include setting aside a portion of the host memory for use as a host cache, optionally clearing that memory, and sending the address for that portion to the SSD.

Referring to FIG. 1, for example, host CPU 108 may reserve a portion of RAM 110 for use as a host cache 112 and send to device 104 information that device 104 needs to access host cache 112, e.g., the logical address range that host cache 112 occupies in host RAM 110. In one embodiment, unless the host needs to reclaim some or all of that memory space (described in more detail below), the space occupied by host cache 112 is locked for exclusive use by device 104 between device power up and power down.

At step 304, operation of the SSD starts or resumes using the L1 cache. At step 306 the most frequently used tables are cached in the L1 cache. Referring to FIG. 1, for example, controller 120 on device 104 may store the most recently used metadata in control table(s) 124 within device cache 118 (e.g., on-board SRAM.) In this embodiment, metadata is not moved into L2 cache right away, but instead is moved into L2 cache only when there is a need to do so.

If, at step 308, it is determined that the L1 cache is not full, the process returns to step 304, in which the SSD resumes operation using the L1 cache. If, at step 308, it is determined that the L1 cache is full, the least recently used (LRU) tables in L1 cache are identified (step 310) and cached into L2 cache across the host bus (step 312.) The SSD then resumes operation using both L1 and L2 caches (step 314.) Referring to FIG. 1, for example, controller 120 on device 104 may determine that device cache 118 cannot store any more control tables 124 and therefore identifies the least recently used table or tables and transfers them into host cache 112 via host bus 106.

At step 314, the SSD operates using L1 and L2 caches. Referring to FIG. 1, for example, in one embodiment, once device 104 learns about the buffer address in host RAM 110, device 104 may transfer all or partial control data tables 124 to the host cache 112 (becoming control tables 114.) During read operations from device 104, address translation is performed using control tables 124 stored on device cache 118 as well as control tables 114 stored in host cache 112. In one embodiment, control data that is most used is retained in device cache 118 and less recently used control data is either flushed to host cache 112 or, if it already exists in host cache 112, removed from device cache 118 completely. This fetch of control data 114 from host cache 112 is very fast and avoids bottleneck on local (flash) bus 122.

If and when host 102 needs to reclaim cache space allocated for use by the device (e.g., host cache 112), host 102 can temporarily deplete the cache space. Doing so only reduces the performance of device 104 temporarily without introducing any data integrity issues given the nature of the data that is stored in the cache. The flowchart below details the method.

In the embodiment illustrated in FIG. 3, the host has the option to reclaim the memory space that it had previously allocated for use as host cache 112. Thus, at step 316, it is determined whether the host needs some or all of the L2 cache. If not, the process returns to step 314, where the SSD resumes operation using L1 and L2 caches. If the host does need that memory space, however, the process goes to step 318, in which the host depletes the L2 cache and reclaims that memory space. Referring to FIG. 1, for example, host 102 may reclaim some or all of the space in RAM 110 currently used by host cache 112. In one embodiment, host 102 may notify device 104 of its intent to reclaim that space and transfer the control tables 114 back to device 104 over host bus 106 or give device 104 the opportunity to retrieve control tables 114 by its own request. In another embodi-ment, however, host 102 may simply reclaim host cache 112 without warning, in which case any information stored within host cache 112 is lost.

At step 320, the host recalculates the address bounds for the L2 cache and notifies the SSD of the change. The host may decide to reclaim some of the L2 cache or all of the L2 cache. Thus, at step 322, if the host has reclaimed all of the L2 cache space, then there is not any L2 cache left for use by the SSD, and the process returns to step 304, where the SSD resumes operation using only L1 cache. If, at step 322, the host has left some L2 cache for the SSD to continue to use, the process returns instead to step 314, where the SSD resumes operation using its L1 cache and whatever L2 cache is available.

In one embodiment, host bus 106 uses a protocol that allows device 104 to be the bus master. In this embodiment, device 104 does not need to use a host bus adapter to communicate with host RAM 110; this allows device 104 to directly read and write host cache 112 memory space transparently.

In one embodiment, host side software should allocate the memory needed for host (L2) cache 112, notify device 104 how to access that memory, and release that memory to support device (L1) cache 118 extension. This might require a specific host application to be spawned or a third party driver installation on host system. Conventional methods for allocating and releasing memory may be used and will not be described in detail here.

Caching Algorithm.

As detailed in FIG. 3 above, in one embodiment, host cache 112 is used as an L2 cache, e.g., where the least recently used (LRU) control data that overflows from the L1 cache is identified and cached across a host bus into host cache and where the SSD accesses its control tables from both the L1 and L2 caches. Referring to FIG. 1, for example, most recently used (MRU) tables may first be cached in L1 cache 118 and the overflow is cached in L2 cache across 112 via host bus 106. When host 102 wishes to reclaim some L2 cache 112 space, the host driver that allocates L2 space informs device 104 of the modified L2 address space bounds. During write operations, if entries in control table 114 or 124 become dirty, such entries will be coalesced and flushed to non-volatile memory 116.

NVMe Example.

There are a number of ways by which host 102 may notify device 104 of the presence and size of host cache 112. One method makes use of features provided in the NVMe protocol. The non-volatile memory (NVM) host controller interface (NVMHCI) specification, also known as NVM express or "NVMe", is a specification for accessing solid state drives attached through the peripheral component internet (PCI) express bus, also known as "PCIe". The NVMe protocol allows up to 64K command queues, each of which can hold up to 64K read/write commands. The read/write commands in a queue are assigned to buffers in the host address space (i.e., RAM), which the SSD then pushes data into or pulls data out of respectively. In one embodiment, host cache 112 could be reserved by creating an NVMe queue consisting of dummy commands that would request host address buffer space and lock it indefinitely. This creating of dummy queue can be accomplished by a third party driver or a host application. Upon acquiring the additional host side buffer space, its address is passed down to the device. Storage device 104 can then access these buffer spaces, which make up host cache 112.

Figure 4:
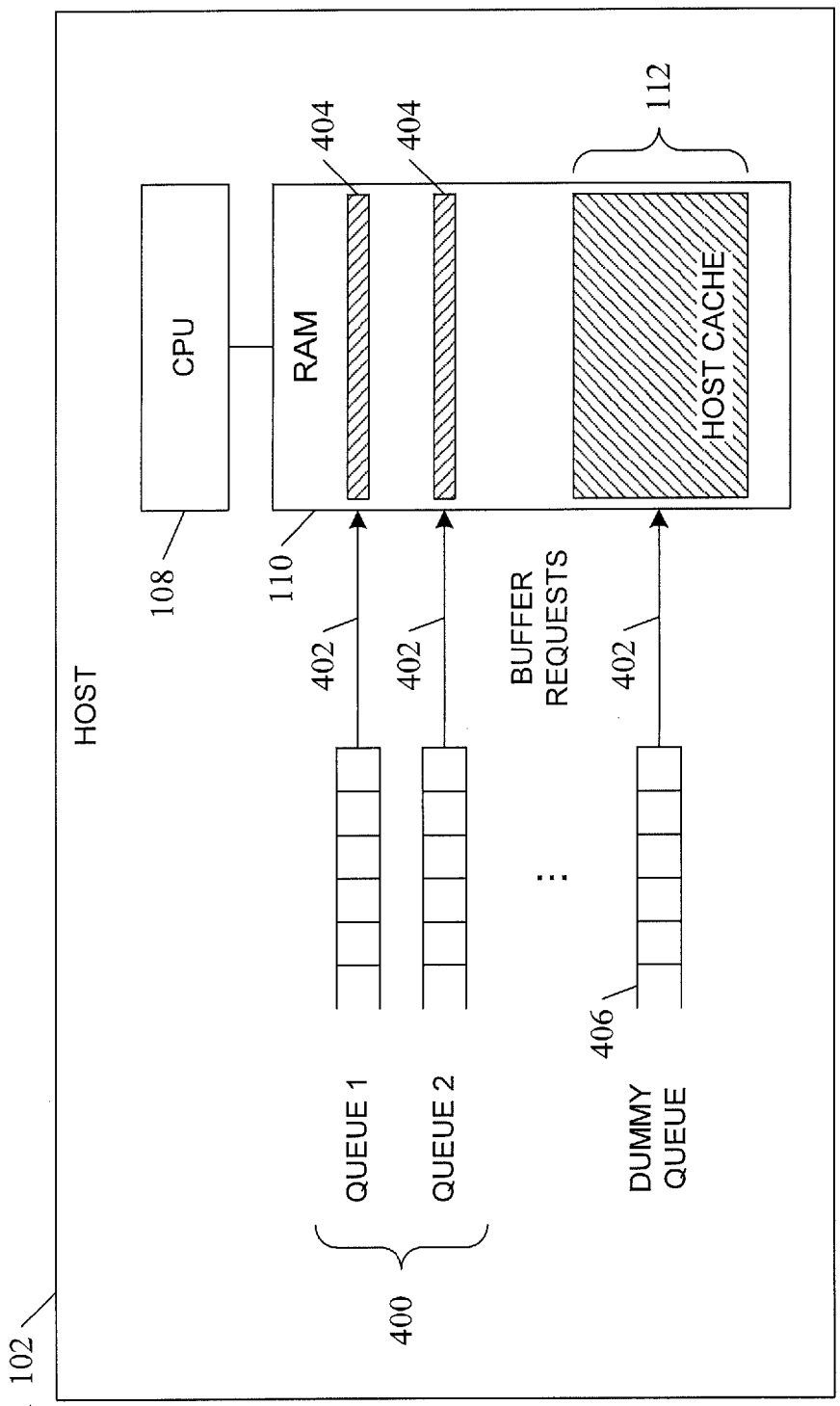
FIG. 4 is a block diagram illustrating an exemplary use of a dummy NVMe queue to reserve buffer space for a host cache within a host RAM according to another embodiment of the subject matter described herein.

FIG. 4 is a block diagram illustrating an exemplary use of a dummy NVMe queue to reserve buffer space for a host cache within a host RAM according to another embodiment of the subject matter described herein. In the embodiment illustrated in FIG. 4, in addition to normal NVMe queues 400 1 and 2, which make buffer requests 402 that result in the reservation of buffer space 404 in RAM 110, host 102 includes a dummy queue 406, which also makes buffer requests 402 that result in the creation of host cache 112.

In one embodiment, the data that is stored by device 104 across host bus 106 into host cache 112 may be selected such that the operation of device 104 can continue even if that data is lost, deleted by host 102, or otherwise unavailable to device 104. In one embodiment, host cache 112 can be used by device 104 to store data that can be reconstructed from NVM 116 even after a power cycle. Such data includes, but is not limited to: control tables for flash management that are always backed up, such as mapping data and other metadata; device configuration data that is loaded at boot time from NVM 116 and never modified; garbage collection data for which the sources are available on device 104; and even cached read data.

The subject matter described herein is not limited to using the NVMe protocol to allow host cache 112 to be used to cache data for a storage device 104. Any suitable protocol is capable of allocating cache space on host 102 and making that space available to a connected storage device 104 is intended to be within the scope of the subject matter described herein.

According to another aspect of the subject matter described herein, where the PCIe protocol is used on the host bus, the channel splitting functionality of the PCIe protocol can be used to implement host caching of data for a connected storage device 104. Conventionally, the PCIe protocol is used to maintain QoS on the host bus. According to an aspect of the subject matter described herein, the high priority virtual channel on the PCIe bus may be used to transfer metadata to and from storage device 104 and the lower priority virtual channel can be used to transfer data to and from storage device 104.

The subject matter described herein has the additional advantage that the same design can be used for both high-end and low-end designs: when cache memory size needs to be increased with the increase in device capacity, extra tables may be saved to host memory. This can reduce the cost of the product, improve power savings, and improve the balance the host vs. flash bandwidth.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for solid state caching across host bus, the method comprising:
   during operation of a solid state drive (SSD) having non-volatile memory (NVM) for bulk storage of data and metadata, a first random access memory (RAM), and a host bus interface located on the SSD for accessing a second RAM located on a host and separate from the first RAM:
      using the first RAM as a cache for storing a first portion of metadata; and
      using the second RAM as a cache for storing a second portion of metadata, wherein the second RAM is accessed by the SSD via the host bus interface located on the SSD using a protocol that allows the SSD to be the master of the host bus and directly read from and write to memory space of the cache implemented using the second RAM, wherein the host is configured to notify the SDD of an intent to reclaim at least a portion of the memory space in the second RAM that is allocated to the SSD and transfer some or all of the second portion of metadata back to the SSD via the host bus or provide the SDD an opportunity to request and retrieve some or all of the second portion of metadata.

2. The method of claim 1 wherein metadata comprises at least one of:
   control tables for management of the NVM on the SSD;
   configuration data for the SSD;
   garbage collection data for sources available on the SSD; and
   data used by a flash translation layer (FTL).

3. The method of claim 1 wherein using the first RAM as a cache for storing a first portion of metadata and using the second RAM as a cache for storing a second portion of metadata includes:
   receiving an I/O request from the host;
   in response to receiving an I/O request from the host, determining whether first metadata associated with the I/O request is stored in the first RAM;
   in response to determining that first metadata is stored in the first RAM, retrieving the first metadata from the first RAM and using the retrieved metadata to process the I/O request;
   in response to determining that the first metadata is not stored in the first RAM, determining whether the first metadata is stored in the second RAM;
   in response to determining that the first metadata is stored in the second RAM, retrieving the first metadata from the second RAM via the host bus and using the retrieved metadata to process the I/O request; and
   in response to determining that the first metadata is not stored in the second RAM, retrieving the first metadata from the NVM and using the retrieved metadata to process the I/O request.

4. The method of claim 1 comprising, after retrieving the first metadata, determining whether to store at least some metadata in the second RAM, and, upon a determination that some metadata should be stored in the second RAM, identifying metadata to be stored in the second RAM and transferring the identified metadata into the second RAM via the host bus.

5. The method of claim 1 wherein the host bus interface comprises a non-volatile memory express (NVMe) interface.

6. The method of claim 5 wherein using the second RAM as a cache includes reserving a portion of the second RAM by issuing requests for host address buffer space.

7. The method of claim 2 wherein the second portion of metadata comprises metadata that can be recreated by the SSD in the event that the SSD loses access to the second RAM.

8. The method of claim 1 wherein the host bus interface comprises a peripheral component interconnect express (PCIe) interface and wherein the method further comprises utilizing a high priority virtual channel accessible via the PCIe interface for transferring metadata to and from the second RAM memory and a low priority virtual channel for transferring data to and from the second RAM memory.

9. The method of claim 1 wherein the NVM comprises a 3D NAND NVM.

10. A system for solid state caching across host bus, the system comprising:

a solid state drive (SSD) having non-volatile memory (NVM) for bulk storage of data and metadata, a first random access memory (RAM), and a host bus interface located on the SSD for accessing a second RAM memory located on a host and separate from the first RAM, wherein the SSD drive is configured to:

use the first RAM as a cache for storing a first portion of metadata; and use the second RAM as a cache for storing a second portion of metadata, wherein the second RAM is accessed by the SSD via the host bus interface located on the SSD using a protocol that allows the SSD to be the master of the host bus and directly read from and write to memory space of the cache implemented using the second RAM, wherein the host is configured to notify the SDD of an intent to reclaim at least a portion of the memory space in the second RAM that is allocated to the SSD and transfer some or all of the second portion of metadata back to the SSD via the host bus or provide the SDD an opportunity to request and retrieve some or all of the second portion of metadata.

11. The system of claim 10 wherein metadata comprises at least one of:

control tables for management of the NVM on the SSD;
configuration data for the SSD;
garbage collection data for sources available on the SSD; and
data used by a flash translation layer (FTL).

12. The system of claim 10 wherein the SSD is configured for:

receiving an I/O request from the host;
in response to receiving an I/O request from the host, determining whether first metadata associated with the I/O request is stored in the first RAM;
in response to determining that first metadata is stored in the first RAM, retrieving the first metadata from the first RAM and using the retrieved metadata to process the I/O request;
in response to determining that the first metadata is not stored in the first RAM, determining whether the first metadata is stored in the second RAM;
in response to determining that the first metadata is stored in the second RAM, retrieving the first metadata from the second RAM via the host bus and using the retrieved metadata to process the I/O request; and
in response to determining that the first metadata is not stored in the second RAM, retrieving the first metadata from the NVM and using the retrieved metadata to process the I/O request.

13. The system of claim 10 wherein the SSD is configured for, after retrieving the first metadata, determining whether to store at least some metadata in the second RAM, and, upon a determination that some metadata should be stored in the second RAM, identifying metadata to be stored in the second RAM and transferring the identified metadata into the second RAM via the host bus.

14. The system of claim 10 wherein the host bus interface comprises a non-volatile memory express (NVMe) interface.

15. The system of claim 14 wherein using the second RAM as a cache includes reserving a portion of the second RAM by issuing requests for host address buffer space.

16. The system of claim 10 wherein the second portion of metadata comprises metadata that can be recreated by the SSD in the event that the SSD loses access to the second RAM.

17. The system of claim 10 wherein the host bus interface comprises a peripheral component interconnect express (PCIe) interface and wherein the host bus interface utilizes a high priority virtual channel accessible via the PCIe interface for transferring metadata to and from the second RAM memory and a low priority virtual channel for transferring data to and from the second RAM memory.

18. The system of claim 10 wherein the NVM comprises a 3D NAND NVM.

19. A non-transitory computer readable medium having stored thereon executable instructions that when executed by the processor of a computer control the computer to perform steps comprising:

during operation of a solid state drive (SSD) having non-volatile memory (NVM) for bulk storage of data and metadata, a first random access memory (RAM), and a host bus interface located on the SSD for accessing a second RAM memory located on a host and separate from the first RAM:

using the first RAM as a cache for storing a first portion of metadata; and using the second RAM as a cache for storing a second portion of metadata, wherein the second RAM is accessed by the SSD via the host bus interface located on the SSD using a protocol that allows the SSD to be the master of the host bus and directly read from and write to memory space of the cache implemented using the second RAM, wherein the host is configured to notify the SDD of an intent to reclaim at least a portion of the memory space in the second RAM that is allocated to the SSD and transfer some or all of the second portion of metadata back to the SSD via the host bus or provide the SDD an opportunity to request and retrieve some or all of the second portion of metadata.

* * * * *